United States Patent

Riehemann

[11] Patent Number: 5,150,112
[45] Date of Patent: Sep. 22, 1992

[54] INTERFACE FOR USE BETWEEN TWO COMMUNICATION UNITS

[75] Inventor: Thomas Riehemann, Bühlertal, Fed. Rep. of Germany

[73] Assignee: Robert Bosch GmbH, Stuttgart, Fed. Rep. of Germany

[21] Appl. No.: 499,389

[22] PCT Filed: Oct. 10, 1988

[86] PCT No.: PCT/EP88/00904
§ 371 Date: Jun. 7, 1990
§ 102(e) Date: Jun. 7, 1990

[87] PCT Pub. No.: WO90/04296
PCT Pub. Date: Apr. 19, 1990

[51] Int. Cl.⁵ .......... H04Q 1/00; H04B 3/20; H04L 5/16; H04M 11/00
[52] U.S. Cl. .......... 340/825.3; 340/825.77; 379/98; 379/345; 370/31
[58] Field of Search .......... 340/825.3, 825.77; 375/36; 370/31, 29; 178/2 A; 379/98, 345

[56] References Cited

U.S. PATENT DOCUMENTS

| 3,638,183 | 1/1972 | Prögler | 340/825.77 |
| 4,279,033 | 7/1981 | Brunelli et al. | 370/29 |
| 4,287,589 | 9/1981 | Nakamura et al. | 370/31 |
| 4,398,298 | 8/1983 | Van Egmond et al. | 375/36 |
| 4,419,752 | 12/1983 | Sonnenberger et al. | 370/29 |
| 4,679,227 | 7/1987 | Hughes-Hartogs | 379/98 |
| 4,726,034 | 2/1988 | Schillhof et al. | 375/36 |
| 4,841,561 | 6/1989 | Hill | 379/98 |

FOREIGN PATENT DOCUMENTS

| 0010760 | 2/1981 | Japan | 370/31 |
| 1383037 | 12/1973 | United Kingdom | 370/31 |

Primary Examiner—Donald J. Yusko
Assistant Examiner—Brian Zimmerman
Attorney, Agent, or Firm—Walter Ottesen

[57] ABSTRACT

An interface for use between a first communication unit having a two-wire connection and a second communication unit having a single-wire connection includes a comparator (IC1) having a fixed potential ($V_{(-)}$) at its inverting input and having its output connected to one of the two-wire connections while the potential ($V_{(+)}$) applied to the non-inverting input is determined by a switching network (transistors T1 and T2 and resistors R2, R3, R4, R7, R12) responsive to the potential on the second of the two-wire connections and on the single-wire connection to enable the first communication unit to receive data from the second communication unit but not to receive self-transmitted data.

5 Claims, 1 Drawing Sheet

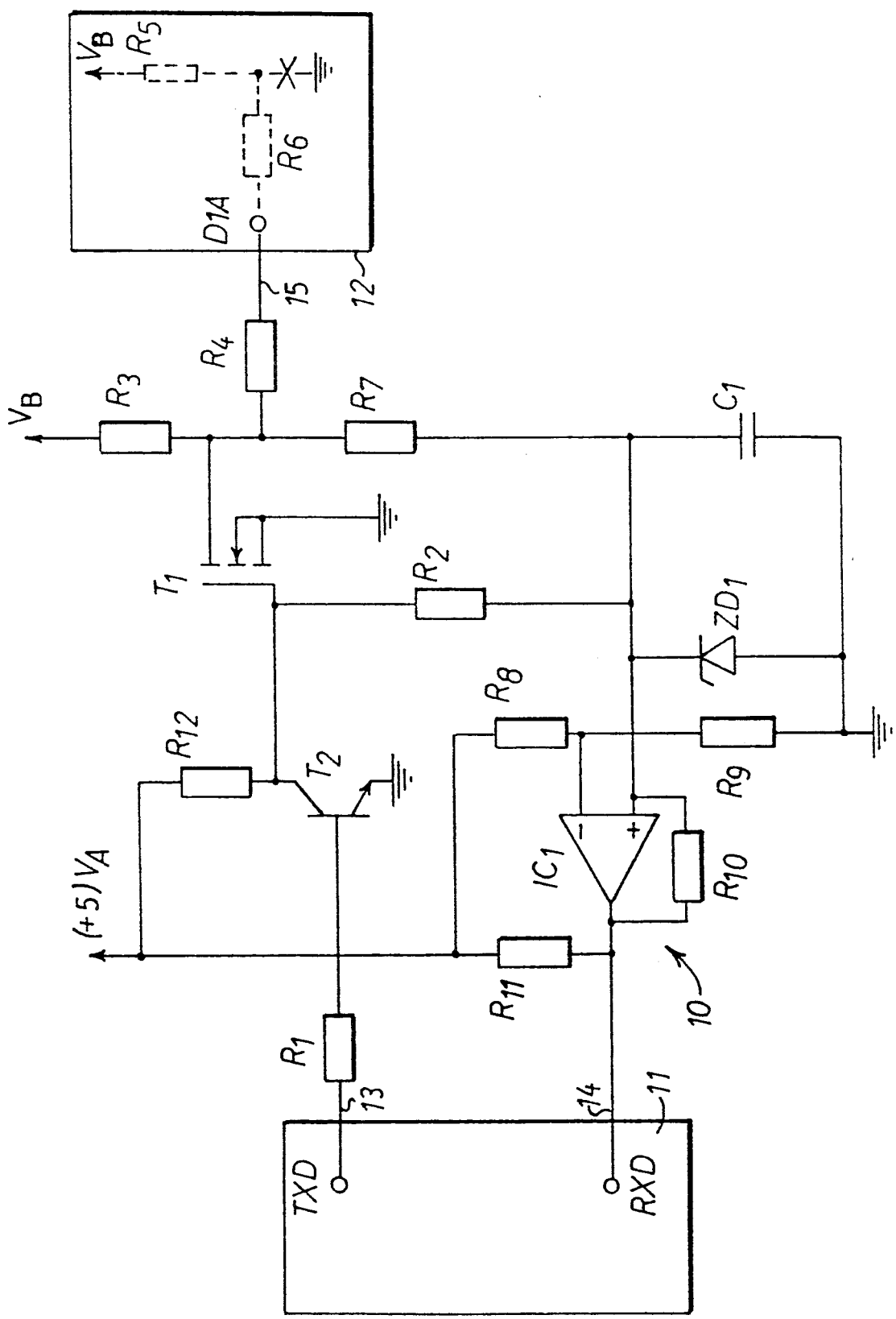

INTERFACE FOR USE BETWEEN TWO COMMUNICATION UNITS

FIELD OF THE INVENTION

The present invention relates to an interface for use between a first communication unit having a two-wire connection and a second communication unit having a single-wire connection.

BACKGROUND OF THE INVENTION

Such communication units may form part of a device used in the control of a fuel system of an internal combustion engine in response to monitoring exhaust gas composition; the first communication unit having a two-wire connection may be a microcomputer and the second communication unit having a single-wire connection part of the monitoring system.

It is known to control the fuel-to-air ratio of an internal combustion engine in response inter alia to the composition of the results of the exhaust gas with a view to reduction in air pollution, and frequently catalytic oxidation is adapted in order to substantially avoid the discharge into the atmosphere of carbon monoxide resulting from incomplete combustion of the fuel. To this end the exhaust gas is analysed by measurement of its thermal conductivity and its composition expressed as the percentage of carbon dioxide present. With microcomputer control of the fuel system there is a need for supplying to the microcomputer signals characterising the instantaneous actual composition and the corresponding desired composition of the exhaust gas as well as other engine performance parameters. The nature of these signals as regards their levels, input and output impedances and their frequency of transmission have been established by ISO specifications.

When the microcomputer is in a position to transmit data to a communications partner it is desirable that it should be able to do so without delay and a conventional two-wire interface involving direct connection between two wires can result in the computer receiving self-transmitted data which is undesirable for echo suppression.

SUMMARY OF THE INVENTION

The interface of the invention is for use between a first communication unit having a two-wire connection and a second communication unit having a single-wire connection. The interface includes: a comparator whose output is extended to a first of the two-wire connections and has its non-inverting input extended to the single-wire connection for transmitting data signals from the second communication unit to the first communication unit; a transistor connected to the second of the two-wire connections; and, a switching network responsive to the high/low potential of the second of the two-wire connections and the high/low potential of the single-wire connection for controlling transmission through said transistor and for controlling the potential of the non-inverting input of the comparator, whereby when a data signal is transmitted by the first communication unit on the second of the two-wire connections the output of the comparator is at high potential and the first of the two-wire connections is at high potential so that the data transmitted by the first communication unit is not received by the first communication unit on the first of the two-wire connections and when a data signal is transmitted by the second communication unit on the single-wire connection the output of the comparator is at low potential and such transmitted data is received by the first communication unit on said first of the two-wire connections.

An interface in accordance with the invention overcomes the disadvantage of a conventional two-wire to two-wire interface and facilitates rapid transmission of data by the microcomputer while at the same time preventing reception of self-transmitted data.

According to a feature of the invention, the switching network can be formed with the transistors and a plurality of resistors so that the potential at the output of the comparator can be made dependent upon the potentials on one of the two-wire connections of the first communications unit which can be a microcomputer and of the single-wire connection of the communications partner.

BRIEF DESCRIPTION OF THE DRAWING

The invention will be further described by way of example, with reference to the accompanying drawing, which is a circuit diagram of an interface according to a preferred embodiment of the invention.

DESCRIPTION OF THE PREFERRED EMBODIMENTS OF THE INVENTION

The interface 10 whose circuit is shown in the drawing is for connecting a first communication unit 11 such as a microcomputer requiring a two-wire interface to a second communication unit or partner 12 for which a single-wire interface would be suitable. In normal operation when the first communication unit 11 transmits no data, a pin TXD is at a high potential whereas when the first communication unit 11 transmits data, the pin TXD is at low potential and data is transmitted from that pin. When the communication partner 12 is inactive a pin D1A is at a high potential and when the communication unit 12 has data to transmit the pin D1A is at a low potential and data is transmitted from that pin. Transmitted data can be received by the communication unit 11 on pin RXD when at a low potential.

In the interface 10, leads 13 and 14 comprise the first and second of the two-wire connections to the communication unit 11, and the lead 15 is the single-wire connection to the second communication unit 12. A resistor R1 connects lead 13 to the base of a transistor T2 whose emitter is connected to ground and whose collector is connected to a source $V_A$ through a resistor R12. The collector of the transistor T2 is connected via a resistor R2 to the non-inverting input of a comparator IC1. A predetermined potential is applied to the inverting input of the comparator IC1 by the potential divider formed by resistors R8 and R9 connected between the source $V_A$ and ground. The output of the comparator IC1 is connected to the source $V_A$ through resistor R11 and to the non-inverting input through a resistor R10. The output of the transistor T2 at the collector is connected to the gate of FET transistor T1 whose source is connected through a resistor R3 to a voltage source $V_B$ and through a resistor R4 to the lead 15 which forms the single-wire connection to a pin DIA of the communication partner 12. The conditions existing inside the communication partner 12 with regard to the potential of the pin DIA are illustrated diagrammatically by a resistor R6 which can be connected to a source illustrated as $V_B$ through a resistor R5 or to ground. The junction between resistors R3 and R4 is extended to the non-inverting input of the comparator IC1 through the resistor R7, and a Zener diode ZD1 and a capacitor C1 are connected between the non-inverting input and ground for stabilization.

The potential $V_{(-)}$ at the inverting input of the comparator IC1 is set by $V_A$ and resistors R8 and R9, but the potential $V_{(+)}$ at the non-inverting input of the comparator IC1 depends upon whether the pin TXD is at a high or low potential and whether the pin DIA is at a high or low potential. Three conditions may be considered as follows:

1. When the communication unit 11 is inactive or does not transmit any data the pin TXD is at a high potential so that transistor $T_2$ is switched through and the end of the resistor R2 remote from the non-inverting input of the comparator IC1 is effectively connected to ground and the potential at the non-inverting input is determined by the voltage divider formed on the one hand by resistor R2 and on the other hand resistor R7 in series with the parallel combination of resistor R3 and resistors R4, R5, R6 connected between $V_B$ and ground, $V_A$ can be conveniently 5 volts and $V_B$ can vary between 6 and 50 volts and the values of the resistances of the resistors can be chosen so that when $V_B$ is as low as 6 volts the potential at the non-inverting input $V_{(+)}$ of the comparator IC1 will be greater than the potential $V_{(-)}$ at the inverting input so that the output of the comparator IC1 will be at a high potential so that the lead 14 keeps pin RXD at a high potential to prevent it receiving data.

2. When the communications unit 11 transmits data the pin TXD is at a low potential and this blocks transistor T2 which enables transistor T1 to switch through, and the potential $V_{(+)}$ at the non-inverting input of the comparator IC1 is determined by the potential divider formed by resistors R12, R2 and R7 connected between source $V_A$ and ground. The potential $V_{(+)}$ can then still be higher than that $V_{(-)}$ at the inverting input so that the output of the comparator IC1 will remain at high potential thereby maintaining pin RXD at high potential and preventing the reception of self-transmitted data.

3. When the communication partner 12 transmits data the pin DIA is at a low potential. If at this time pin TXD is at a high potential the transistor T2 is switched through and one end of resistor R2 is effectively connected to ground. Resistors R3, R4 and R6 form a potential divider connected between $V_B$ and ground, and a fraction of the potential at the junction of resistors R3 and R4 is applied to the non-inverting input of the comparator IC1 by the voltage divider formed by resistors R7, R2 and R12. By suitable choice at the values of resistors this potential $V_{(+)}$ can be very much less than the potential $V_{(-)}$ at the inverting input, even when $V_B$ is as high as 50 volts, so that the output of the comparator IC1 is then at a low potential and the pin RXD of the communication unit 11 is held at a low potential so that data transmitted from the communication partner 12 can be received in the communication unit 11.

By way of example in a preferred embodiment the transistor T1 is a BC848, the transistor T2 is a BSS123, the comparator IC1 is an LM2901, Zener diode ZD1 is a Z6V8, $V_A$ is 5 volts and $V_B$ 6–50 volts; and the resistances of the various resistors are as follows:

| | |
|---|---|
| R1 | 1 kohm |
| R2 | 100 ohm |
| R3 | 100 kohm |
| R4 | 100 ohm |
| R5 | 100 kohm |
| R6 | 100 ohm |
| R7 | 100 kohm |
| R8 | 56 kohm |
| R9 | 10 kohm |
| R10 | 464 kohm |
| R11 | 2 kohm |
| R12 | 2.7 kohm | and the capacitor C1 0.1 nF.

With these components the potential at the inverting input of the comparator IC1 is as follows:

$$V_{(-)} = \frac{R9}{R8 + R9} \times V_A = 0.75 \text{ V}$$

under the first conditions when the pin TXD is at a high potential, the potential at the non-inverting input of the comparator is as follows:

$$V_{(+)} = \frac{R2}{R2 + (R_3 \| (R^4 + R_5 + R^6)) + R_7} \times V_B = \frac{1}{6} V_B$$

so that with $V_B$ at the minimum of 6 volts $V_{(+)} = 1$ volt.

Under the second conditions when pin TXD is at a low potential, the potential $V_{(+)}$ at the non-inverting input of the comparator IC1 is as follows:

$$V_{(+)} = \frac{R7}{R7 + R12 + R2} \times V_A = 3.75 \text{ V}$$

$V_{(+)}$ is therefore greater than $V_{(-)}$, namely 0.75 v, and the output of the comparator is at a high potential.

Under the third conditions when pin DIA is at a low potential and pin TXD is at a high potential, the potential $V_{(+)}$ at the non-inverting input of the comparator IC1 is as follows:

$$V_{(+)} = \frac{R4 + R6}{R3 + R4 + R6} \times \frac{R2}{R7 + R2} \times V_B = \frac{1}{2000} \cdot V_B$$

when $V_B$ is at its maximum of 50 volts the potential $V_{(+)}$ at the non-inverting input of the comparator IC1 is 23 mV which is less than the potential $V_{(-)}$ at the non-inverting input and the output of the comparator is at a low potential which is applied to the terminal RXD to enable it to receive data.

A particular advantage of an interface embodying the present invention is that of echo suppression since it will be appreciated that the data transmitted by the communications unit 11 on pin TXD are not simultaneously received by the microcomputer on pin RXD. In the 8051 family of microcomputers, the transmitting process is initiated as soon as data is sent to a transmitting register and the actual transmitting process subsequently takes place automatically without having to be controlled by software. With a conventional interface the program has to be interrupted in order to wait until the transmitting process has ended and the subsequent clearing of the receiving register where data transmitted a short time previously has been stored frees the receiving register in order to be able to receive data arriving externally. Such waiting time which is thereby necessitated can accumulate very rapidly if several data transmissions take place each time a program is run since a program cannot be completed during the waiting time and any time critical program sequences can be inacceptably delayed.

I claim:

1. An interface for interfacing between a first communication unit having a two-wire connection and a second communication unit having a single-wire connection, the interface comprising:

a comparator having an output connected to a first of the two-wire connections and a non-inverting input connected to the single-wire connection for transmitting data signals from the second communication unit to the first communication unit;

a first transistor connected to the single-wire connection; and, switching network means for responding to a high/low potential of the second of the two-wire connections and a high/low potential of the single-wire connection for controlling transmission through said transistor and for controlling the potential of said non-inverting input of said comparator, whereby, when a data signal is transmitted by the first communication unit on the second of the two-wire connections, the output of the comparator is at high potential and the first of the two-wire connections is at high potential so that the data transmitted by the first communication unit is not received by the first communication unit on the first of the two-wire connections and, when a data signal is transmitted by the second communication unit on the single-wire connection, the output of the comparator is at low potential and such transmitted data is received by the first communication unit on said first of the two-wire connections;

said switching network means including a second transistor (T2) responsive to the potential of the second connection (TXD) of the two-wire first and second connections (RXD, TXD); and, voltage divider means connected between said second transistor (T2) and said non-inverting input of said comparator for coacting with said second transistor (T2) to control said potential on said non-inverting input so as to cause said output of said comparator to be at a high potential when said first communication unit is inactive (not transmitting and not receiving) and when said first communication unit is transmitting and so as to cause said potential to be low when said first communication unit is receiving.

2. The interface of claim 1, wherein the first transistor is a field-effect transistor (T1) and the collector of the second transistor (T2) is connected to the gate of said field-effect transistor (T1) and to the non-inverting input of the comparator (IC1) which is also connected to the single-wire connection (DIA).

3. The interface of claim 2, wherein said switching network means includes said first and second transistors (T1, T2) and said voltage divider means including a plurality of resistors interconnected to serve as a series of potential dividers determining the potential applied to the non-inverting input of the comparator (IC1), and of which potential dividers a first potential divider (R2, R3, R4, R5, R6, R7) is between a first source ($V_B$) and ground and is effective when the first connection (RXD) of the two-wire connections is at a high potential, a second potential divider (R2, R7, R12) is between a second source ($V_A$) and ground and is effective when the second connection (TXD) of the two-wire connections is at low potential, and a third potential divider (R2, R3, R4, R5, R7) is between the first source ($V_B$) and ground and is effective when the single-wire connection (DIA) is at low potential.

4. The interface of claim 3, wherein the first potential divider is established when the second transistor (T2) is switched through, in which the second potential divider established by the first transistor is switched through, and the third potential divider is established when the single-wire connection is at low potential.

5. The interface of claim 1, wherein a predetermined potential is applied to the inverting input of the comparator (IC1) by a further potential divider ($V_A$: R8, R9), and the non-inverting input of the comparator (IC1) is stabilized by a diode (ZD1) and a capacitor (C1) connected to ground.

* * * * *